United States Patent [19]

Hottenroth et al.

[11] Patent Number: 5,024,208
[45] Date of Patent: Jun. 18, 1991

[54] PORTABLE STOVE

[75] Inventors: Fred W. Hottenroth, Seal Beach; Fred W. Hottenroth, III, Anaheim, both of Calif.

[73] Assignee: ZZ Corp., Los Alamitos, Calif.

[21] Appl. No.: 605,081

[22] Filed: Oct. 29, 1990

[51] Int. Cl.$^5$ .............................................. F24B 3/00
[52] U.S. Cl. ................................................. 126/25 R
[58] Field of Search ..................................... 126/25 R

[56] References Cited

U.S. PATENT DOCUMENTS

| | | | |
|---|---|---|---|
| D. 223,722 | 5/1972 | Stehouwer | D7/02 |
| 222,676 | 12/1879 | Dembrun | 126/25 R |
| 3,116,704 | 1/1964 | Dyars, Sr. et al. | 110/1 |
| 3,159,119 | 12/1964 | Hottenroth et al. | 110/1 |
| 3,191,556 | 6/1965 | Hottenroth et al. | 110/1 |
| 3,219,024 | 11/1965 | Hottenroth et al. | 126/75 |
| 3,279,452 | 10/1966 | Hottenroth et al. | 126/25 |
| 3,374,071 | 3/1968 | Corriher, Jr. et al. | 44/38 |
| 3,413,967 | 12/1968 | Hoock | 126/59.5 |
| 3,540,865 | 11/1970 | Pape . | |
| 3,868,943 | 3/1975 | Hottenroth et al. | 126/25 R |
| 3,957,455 | 5/1976 | Clark | 44/35 |
| 3,982,522 | 9/1976 | Hottenroth et al. | 126/2 |
| 4,037,580 | 7/1977 | Angelo | 126/25 R |
| 4,471,751 | 9/1984 | Hottenroth et al. | 126/25 R |
| 4,730,597 | 3/1988 | Hottenroth et al. | 126/2 |

*Primary Examiner*—Carroll B. Dority
*Attorney, Agent, or Firm*—Herb Boswell

[57] ABSTRACT

A portable stove for burning charcoal and other solid fuel has a continuous vertically oriented insulative side wall. This wall has a continuous bottom edge and its surrounds and defines a hollow fuel chamber. The fuel chamber has an open top. A grate is positioned adjacent the insulative wall proximal to the bottom edge of the insulative wall. As so positioned the grate forms the bottom of the fuel chamber. The insulative wall has a plurality of apertures located along its bottom edge with the apertures spaced around the insulative wall in an array immediately adjacent the grate. A reflector plate is positioned below the grate. An air chamber for channeling combustion air surrounds the reflector plate, the underside of the grate and the bottom most portion of the insulative side wall including the apertures therein. An air control damper is located in the air chamber for controlling the introduction of air into the air chamber.

22 Claims, 3 Drawing Sheets

PORTABLE STOVE

BACKGROUND OF INVENTION

This invention is directed to a portable stove suitable for burning charcoal or other solid fuel in an efficient manner.

Charcoal is utilized as a fuel for cooking and heating by a large segment of the world's population. In many under developed third world urban centers modern fuel distribution means such as electricity, natural gas or propane are not available. The populace of these urban centers generally utilize charcoal as their sole fuel source because it is available in a sufficient quantity at an affordable price. Charcoal derived from real wood burns with a very hot flame. It is quite distinct from so called "charcoal briquettes" that include large amounts of ash, sometimes exceeding 20% ash.

In our U.S. Pat. No. 4,730,597, we described a biomass stove that is particularly suited for utilizing biomass as its fuel. The dampers and air passageways of this stove allow for efficient burning of biomass including small pieces of wood, grasses, dung and other such fuels. A further biomass stove is described in our U.S. Pat. No. 4,471,751. These two stoves are both very efficient. Further, they both can be constructed utilizing hand labor and unsophisticated tools with materials that are readily available in most areas of the world. However, they are more suited for the combustion of biomass as compared to charcoal and thus are more suited for rural users as opposed to urban users since, while charcoal is generally available to the urban user, biomass is not.

With ever increasing shrinkage of our planet's fuel supplies, including biomass and charcoal formed therefrom, efficient usage of fuel is important for all of the earth's populace. Aside from a conservation standpoint, fuel efficiency is also very important from an economic standpoint since there are large segments of the world's population who are very poor.

While the human race has made great technological strides in many areas, for a great number of the world's population needs are very basic. These basic needs include the need for high efficiency cooking stoves that are essentially low tech in construction and do not require exotic or unavailable material for such construction.

BRIEF DESCRIPTION OF THE INVENTION

Even in a day and age where man can almost routinely fly into space in highly sophisticated vehicles that burn prodigious amounts of fuel, it is evident that there still exists a need for new and improved basic high efficiency stoves that can be constructed from readily available materials utilizing either hand or very basic machines. It is therefore a broad object of this invention to provide a portable stove that is capable of burning charcoal and other solid fuels. It is a further object of this invention to provide a portable stove that is simple in construction and operation, durable in use and that can be manufactured by unskilled labor and sold at reasonable cost.

In accordance with these and other objects that will become evident from the remainder of this specification, this invention provides a portable stove for burning charcoal and other solid fuels. The portable stove has a continuous vertically oriented insulative wall. The insulative wall has a continuous bottom edge. A grate is positioned adjacent the insulative wall proximal to the bottom edge of the insulative wall. The insulative wall surrounds and defines in part a hollow fuel chamber. The grate forms the bottom of the fuel chamber and thus completes the fuel chamber. The fuel chamber has an open top. A means is provided for conducting combustion air between the bottom edge of the insulative wall and the grate. A reflector plate is positioned below the grate. An air chamber means for channeling combustion air surrounds the reflector, the under side of the grate and bottom most portion of the side wall including the bottom edge and the means for conducting the combustion air. An air control means is provided for introducing air into the air chamber means in a controlled manner.

In a preferred embodiment of the invention the means for conducting combustion air between the bottom edge of the insulative wall and the grate comprises the insulative wall having a plurality of apertures located therein. These apertures are located in part through the bottom edge of the insulative wall and are spaced around the insulative wall in an array. Further, they are spaced immediately adjacent the grate. Preferably the grate is a solid grate having a plurality of grate openings located therein near the center of the grate. As so located the grate openings are spaced inwardly from the apertures in the insulative wall. An insulative layer can be located on the upper surface of the grate. When used, the insulative layer has openings that correspond to the openings in the grate.

In an illustrative embodiment of the invention, the portable stove includes an outside shell having a continuous vertical side wall and a bottom wall. Together the bottom wall and a portion of the side wall form the air chamber means. Preferably both the outside side wall and the insulative wall are cylindrical in shape with the grate and the reflector plate being round in shape. The reflector plate is positioned between the grate and the bottom wall displaced downwardly from the grate and upwardly from the bottom wall. This forms a first air space between the grate and the reflector plate and a second air space between the reflector plate and the bottom wall.

The means for introducing air can include at least one air inlet orifice in the bottom wall and an adjustable damper positioned on the bottom wall in association with the air inlet orifice. The damper is movable on the bottom wall for opening and closing the air inlet orifice.

In an illustrative embodiment of the invention there are a plurality of air inlet orifices located in the bottom wall in a circular array. The damper is circular in shape and includes a plurality of damper orifices equal in number to the number of the air inlet orifices. The damper further includes solid areas on it between the respective damper inlet orifices. Rotation of the damper on the bottom wall allows for variably positioning either the damper orifices or the solid areas over the air inlet orifices, This provides air inlet openings that are variable in size.

BRIEF DESCRIPTION OF THE DRAWINGS

This invention will be better understood when taken in conjunction with the drawings wherein.

This invention utilizes certain principles and/or concepts as are set forth in the claims appended to this specification. Those skilled in the heating arts will realize that these principles and/or concepts are capable of being utilized in a variety of embodiments that may differ from the embodiments utilized for illustrative purposes herein. For this reason this invention is not to be construed as being limited solely to the illustrative embodiment, but should only be construed in view of the appended claims.

DETAILED DESCRIPTION OF THE INVENTION

Figure 1:
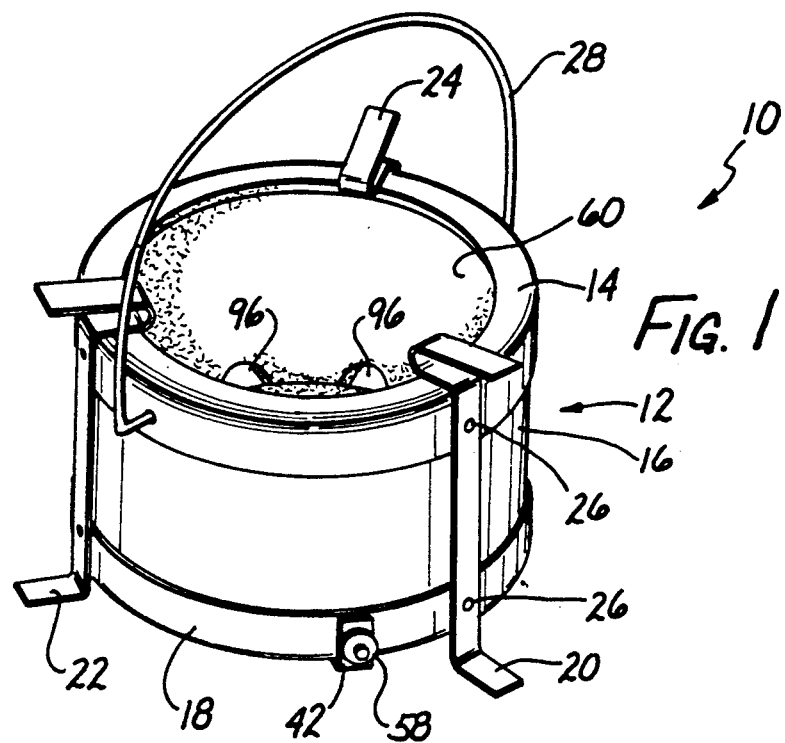
FIG. 1 is an isometric view of a portable stove of the invention.

Seen in FIG. 1 is a portable stove 10 of the invention. While the stove 10 could be constructed in a variety of sizes, typically it is constructed to be about 5 inches in total height and about 7 and ½ inches in diameter. This is a very suitable size for heating a variety of cooking utensils or for space heating of small areas. A typical stove 10 constructed in such a size is capable of outputting from about 8,000 to 9,000 BTU's per hour. The stove 10 is primarily designed for burning charcoal, however, other solid fuels could be utilized, as for instance, scrap wood, branches, twigs, vegetable wastes, cow dung, corn cobs, pelletized fuels and other solid fuels.

As illustrated in the FIGURES, the stove 10 is constructed from essentially two materials, galvanized sheet metal and an inorganic fiber material. Since both of these materials are relative inexpensive and easy to work with, the stove 10 of the invention can be essentially constructed utilizing hand labor or simple sheet metal forming tools.

The stove 10 has an outside shell 12. The outside shell 12 consists of three components, top ring 14, side wall 16 and bottom 18. Three combination leg pot support members 20, 22 and 24 are utilized to support the portable stove 10 as well as a pot that will be heated on the stove 10.

The top ring 14, side wall 16, bottom 18 and the members 20, 22 and 24 are joined together with common rivets collectively identified by the numeral 26. The top ring 14 is joined to the side wall 16 and to the top of the members 20, 22 and 24 via a rivet 26 and the bottom 18 is joined to the side wall 16 and to bottom of the members 20, 22 and 24 via a further rivet 26. Thus, a total of only six rivets are utilized to hold the outside components of the shell 12 together. A bail 28 for carrying the stove 10 fits through holes 30 (only one of which can be seen) that are drilled into the top ring 14 and the side wall 16.

Further holes are formed in certain of the components as are individually described below. In order to maintain separate identity of these holes, depending upon which component they are formed in, various words such as apertures, orifices and openings are utilized to describe them. The particular words chosen to describe the holes are only chosen for the sake of clarity of the specification and the claims attached hereto and thus, while the hole in one component may be identified as an orifice and a further component identified by an opening, if desired these descriptive words could be reversed. Thus, for identifying holes in the various components, the terms apertures, orifices and openings are considered interchangeable; however, for clarity of the specification and claims, each of these terms will be limited to the holes in a single component of the stove 10.

Four holes, hereinafter referred to as orifices, are formed in the bottom 18. These are orifices 32, 34, 36 and 38. Each of these is seen in the plan view of FIG. 5 with only one, orifice 32 illustrated in FIG. 2. A circular damper 40 has an arm 42 attached thereto via a rivet 44. The arm 42 and damper 40 in turn are attached via an eyelet 46 to the bottom 18. The eyelet 46 passes through a hole formed in the end of the arm 42, through a hole through the damper 40 and then through a corresponding hole in the bottom 18 to attach the damper 40 to the bottom 18.

The damper includes four orifices identified by the numerals 48, 50, 52 and 54 that are sized the same as the orifices 32 through 38 in the bottom 18 and are located at the same radial distance from the center (i.e. wherein the eyelet 46 is located) of the bottom 18. Thus, it is possible to rotate the damper 40 such that the orifices 48 through 54 directly overlay the orifices 32 through 38.

The radial distance of the orifices 48 through 54 from the center of the damper 40 is chosen such that the area between two adjacent orifices, as for instance the area identified by the arrow 56 between the orifices 48 and 50, is of the same dimension as the diameter of the orifices, as for instance the diameter of orifice 40. As so sized and spaced, the damper 40 can be rotated to position these areas, i.e. area 56 and similar areas between the other orifices, directly over the orifices 32, 34, 36 and 38 sealing or closing these orifices.

Figure 2:
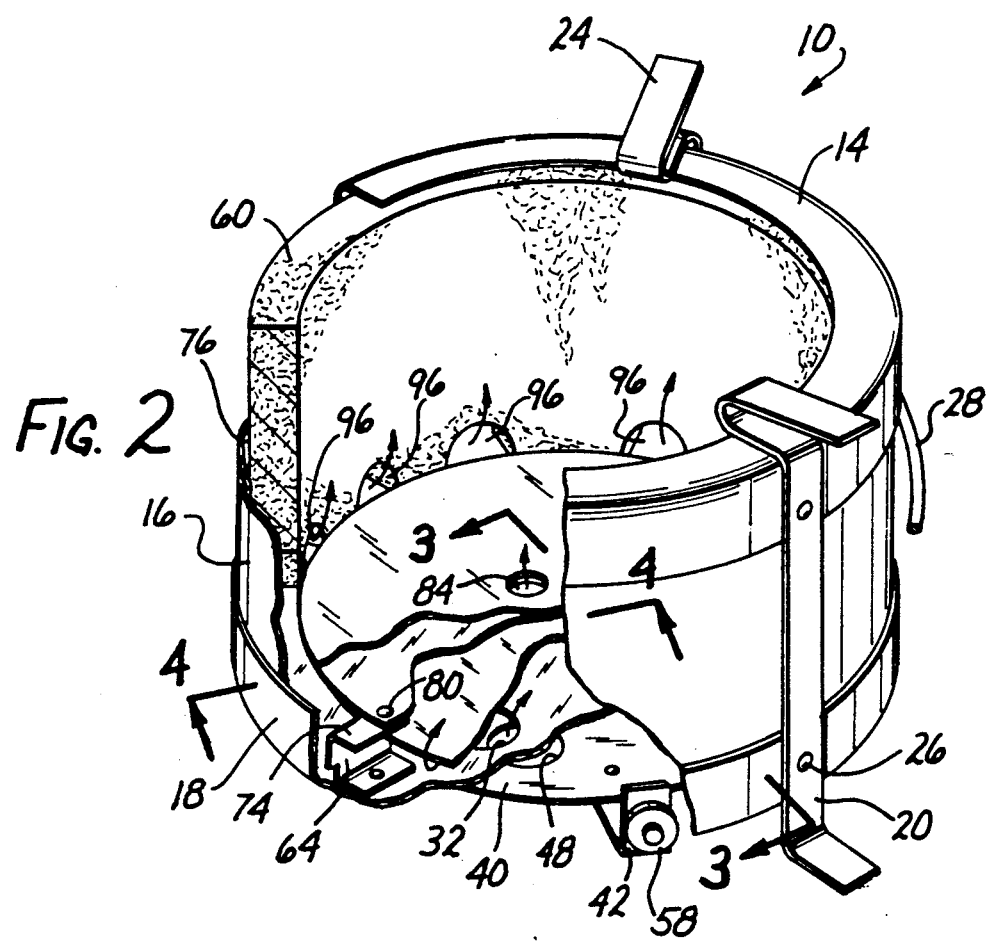
FIG. 2 is an isometric view similar to FIG. 1 with portions of the stove in FIG. 1 cut away to show underlying components.

A small knob 58 formed of an insulative material is riveted to the end of the arm 42 for gripping and manipulation of the arm 42 and thus the damper 40 attached thereto. Damper control is achieved by moving the arm 42 to the left or right as seen in FIGS. 1 and 2. The arm 42 in turn rotates the damper 40 about the eyelet 46.

Figure 5:
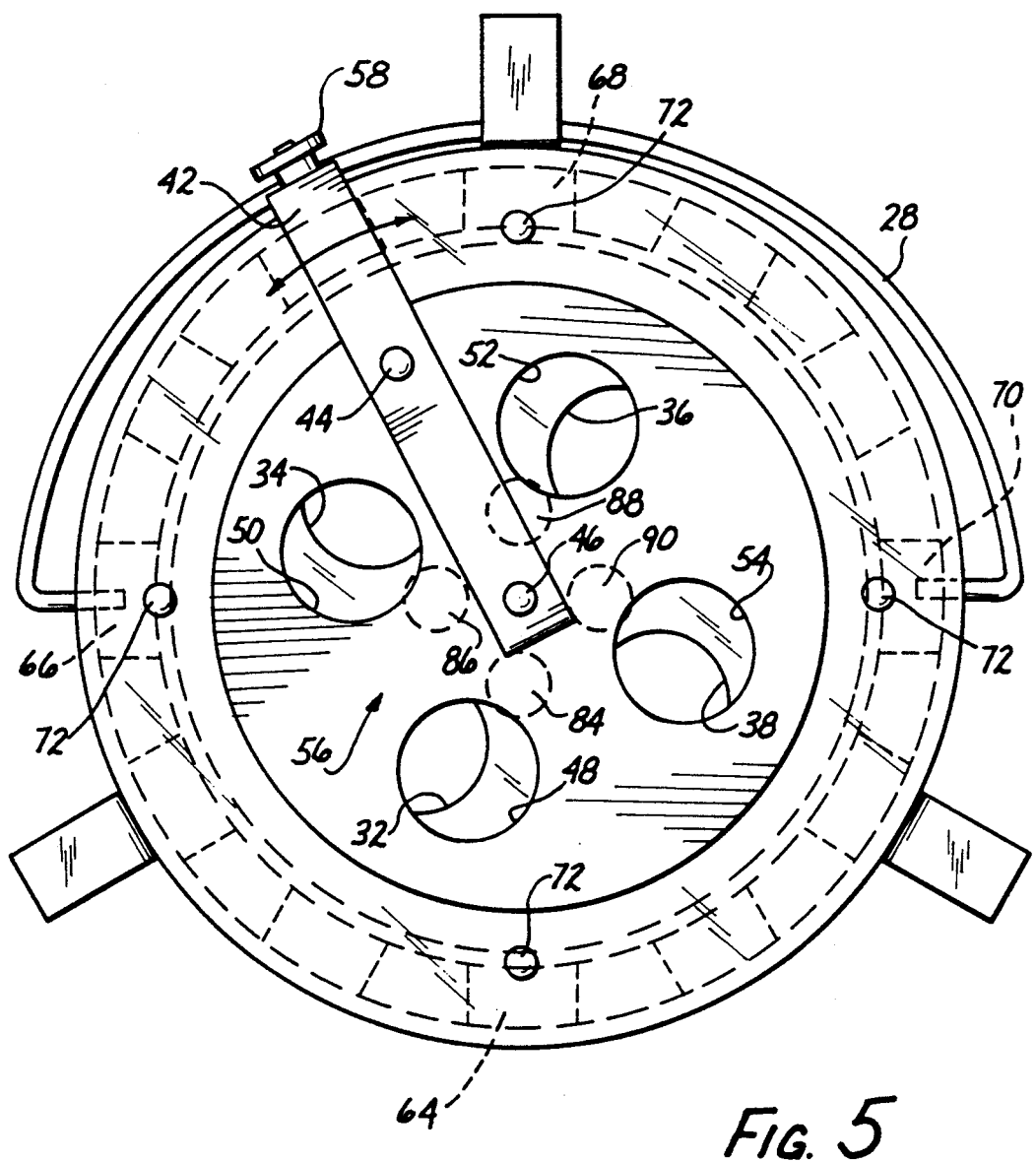
FIG. 5 is a bottom plan view of the stove of FIG. 1.

Using, for example, the orifice 32 in the bottom 18 and orifice 48 in the damper 40, the damper 40 can be rotated through a plurality of positions with respect to the orifice 32. If the arm 42 is rotated counterclockwise as seen in FIG. 5, approximately 15 or so from the position seen in FIG. 5, the area 56 would completely close over the orifice 32. If the arm 42 is rotated clockwise as seen in FIG. 5, more and more of the orifice 48 would overlay the orifice 32 increasing the air opening through the orifice 32. This construction allows for the damper to be rotated on the bottom 18 between a plurality of positions.

The plurality of damper positions include a closed position wherein the solid areas of the damper, as for instance area 56, are positioned directly over the orifices in the bottom 18, as for instance orifice 32, to close off all air through these orifices. The positions further include a fully open position wherein the orifices, as for instance the orifice 48 in the damper 40, are directly aligned with the orifices in the bottom wall 18, as for instance orifice 32, to allow maximum air flow through the orifices. The remaining positions are a plurality of positions in-between the above two extreme positions. In these remaining positions the orifices 32, 34, 36 and 38 in the bottom 18 are partially blocked by varying degrees by the solid areas of the damper 40.

A continuous, vertically oriented insulative wall 60 is located within the interior of the shell 20 extending from the top ring 14 downwardly toward the bottom 18. The height of the wall 60 is less than the height of the outside dimension of the stove 10 such that the bottom edge 62 of the wall 60 is spaced upwardly from the bottom 18 of the shell 12.

The insulative wall 60 is formed of a refractory fiber material with a binder therein. The refractory fiber material can be various inorganic fibers such as rock wool, mineral or slag wools, glass wools or other such fibers, including fibers of alumina, silica and other such minerals. A binder is utilized, as for instance, a clay binder such as bentonite or a metal silicate binder such as sodium or potassium silicate. Cylindrical tubes of such refractory material in various diameters are sold as chimney risers or liners. A more detailed description of such chimney riser or lines can be found in U.S. Pat. No. 3,456,914, the entire contents of which are herein incorporated by reference.

For forming the insulative wall 60 a chimney liner of an appropriate diameter is selected. An appropriate length of the liner sufficient to serve as the wall 60 is cut off from the remainder. Four sheet metal spacers 64, 66, 68 and 70 are located on the top surface of the bottom 18 and are fixed there via rivets collectively by the numeral 72. The bottom edge 62 of the wall 60 rests on the top surface of these spacers, as for instance top surface 74 of spacer 64 seen in FIGS. 2 and 3. The ends of the bail 28 protrude into the wall 60 a short distance to prevent rotation of the wall 60.

The outside diameter of the wall 60 can be slightly smaller than the inside diameter of the side wall 16 of the shell 12 such that a small insulative space 76 remains between the wall 60 and the wall 16 after the wall 60 is located within the wall 16. This space 76 is evident in FIGS. 2, 3 and 4. In using the stove 10, the space 76 serves to maintain the outside of the side wall 16 cool. While the insulative wall 60 serves to inhibit conduction of heat through it to the shell 12, the presence of the small insulated space 76 serves to further reduce heat transfer to the shell 12.

A grate 78 formed in the shape of a circular plate also rests on the top of the spacers 64, 66, 68 and 70. The grate is positioned on the inside of the insulative wall 60 along its bottom edge 62. The grate 78 is riveted to the spacers 64 through 70 via rivets only one of which can be seen, rivet 80 illustrated in FIGS. 2 and 3. An insulative sheet 82 can be positioned on top of the grate 78 and held there utilizing an appropriate binder, as for instance a silicate binder, or simply by friction fitting the sheet 82 within the interior of the wall 60.

Together the wall 60 and the grate 78 (including the insulative sheet 82 thereon, form a combustion chamber that is open at its top but closed at its bottom by grate 78. Openings 84, 86, 88 and 90 are formed through both the grate 78 and the insulative sheet 82 near the center of the grate 78. The openings 84, 86, 88 and 90 thus open into the bottom of the combustion chamber.

Figure 3:
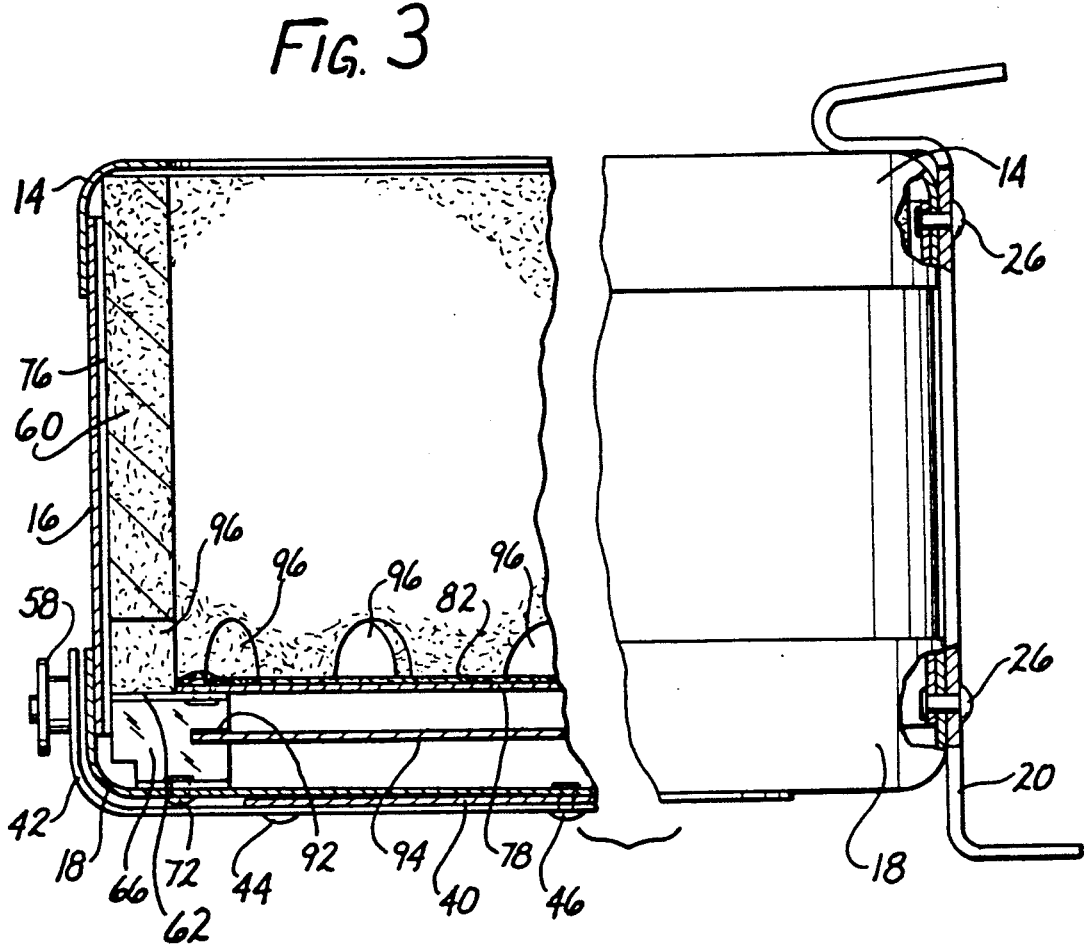
FIG. 3 is a side elevational view about the line 3—3 of FIG. 2.
Figure 4:
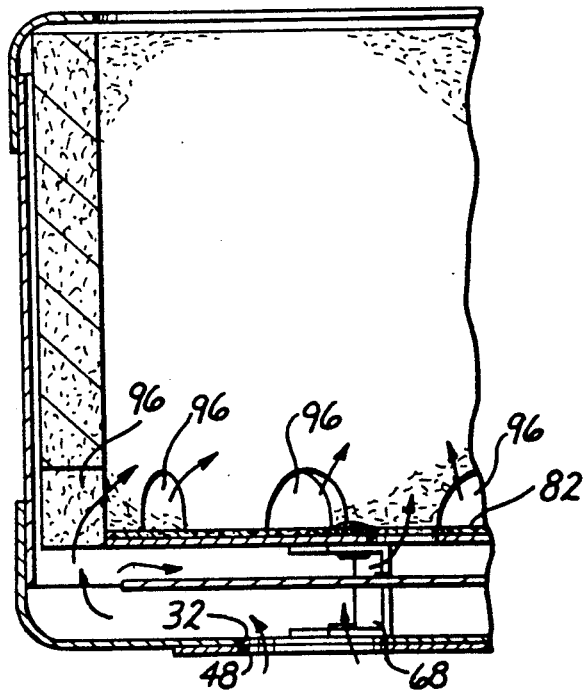
FIG. 4 is a fragmentary side elevational view about the line 4—4 of FIG. 2.

Each of the spacers 64, 66, 68 and 70 include a notch, only one of which can be seen in FIG. 3, notch 92. A reflector plate 94 shaped as a circular disk of a diameter just slightly smaller than the diameter of the grate 78 fits into the notches 92. The notches, as for instance notch 92 and the other unseen notches in the spacers 64, 66, 68 and 70 hold the vertical plate 94 in a fixed position downwardly displaced from the grate 78, but upwardly displaced from the bottom wall 18. As such there is a first air space between the reflector plate 94 and the grate 78 and a second air space between the reflector plate 94 and the bottom 18.

A series of apertures collectively identified by the numeral 96 are formed in an evenly spaced array around the bottom of the wall 60. Each of the apertures 96 cuts through the bottom edge 62 of the wall 60. As such except for those apertures 96 that may be directly located over one of the spacers 64, 66, 68 or 70, the bottom of each of the apertures is open through the bottom edge 62 of the wall 60. The apertures form an air pathway or an air conduit from the bottom of the wall 60 through the wall 60 into the combustion chamber.

When the damper 40 is rotated sufficient to open the orifices 32, 34, 36 and 38 air will flow through the air inlets formed by these orifices up into the space below the reflector plate 94. The air will then flow outwardly to the periphery of the reflector plate 94 and from there it divides into two paths. The first path is through the bottom of the apertures 96 in the wall 60 into the bottom of the combustion chamber. The other air path leads air along the top of the reflector plate 94 beneath the grate 78 to the openings 84, 86, 88 and 90 near the center of the gate 78. While we do not wish to be bound by theory and while we have not made exact measurements it is believed that air flow is divided with approximately 80% of the air flowing through the apertures 96 and remaining 20% flowing through the grate openings 84, 86, 88 and 90.

When fuel is loaded in the combustion chamber of the stove 10 and ignited, some of the heat of that fuel is reflected down through the openings 84, 86, 88 and 90 to the reflector plate 94. This heats the reflector plate 94. When air is passed through the apertures 32, 34, 36 or 38 and moves upwardly against the bottom surface of the reflector plate 94, it cools the reflector plate 94 and in doing so the air is heated. This heated air is then either discharged directly into the combustion chamber through the apertures 96 or it moves along the bottom of the grate 78 towards the openings 84, 86, 88 and 90 in the grate 78. The air in moving across the bottom of the grate 78 removes further heat from the grate 78—cooling the grate and further heating the air. Thus, incoming air through the bottom 18 of the stove 10 is both preheated by the reflector plate 94 and also withdraws heat from the grate 78. In withdrawing heat from the grate 78, not only the air further preheated but the grate 78 cooled. This cooling of the grate 78 contributes to increasing the useful lifetime of the stove 10.

By locating the apertures 96 at the very bottom of the insulative wall 60 and the openings 84, 86, 88 and 90 near the center of the grate, the stove 10 is extremely efficient for combusting charcoal. Since charcoal has already been depleted of any volatile gases during its manufacture, the addition of secondary air near the top of the combustion chamber is not necessary for efficient charcoal burning.

The grate 78 and reflector plate 94 serve to reflect most of the heat within the combustion chamber upwardly and the insulative wall 60 keeps this heat from radiating outwardly. As such most of the heat generate in the stove 10 is directed upwardly toward a pot that might rest on the top surface of the pot support members 20, 22 and 24. Thus, the efficiency of the stove is very high.

Heat can be regulated by moving the arm 42, which in turn rotates the damper 40 about the eyelet 46 to enlarge the opening formed between the orifices 48 through 54 overlaying the orifices 32 through 38. If the damper is completely closed all air is choked off choking the fire and as the damper is opened more and more air is allowed to impinge upon the fuel to increase the burning rate of the fuel and thus heat output of the stove 10.

From the above description it is evident that the lower part of the shell 12 surrounding the bottom of the wall 60, the bottom of the grate 78 and the reflector plate 94 serves as an air chamber means for channeling combustion air. The combustion air within this air chamber means is preheated by the reflector plate 94 and the underneath surface of the grate 78. Further, the damper 40 in conjunction with the various orifices located in it or the bottom 18 serve as an air control means for introducing air into this air chamber in a controlled manner. The apertures 96 serve as a means for conducting combustion air between the bottom edge of the insulative walls 60 and the grate 78.

For ease of construction the insulative wall 60 is chosen as a cylindrical member with other of the components of the stove 10 also having a cylindrical or round shape, as for instance, the circular grate 78 and reflector plate 94. While other shapes might be constructed, the circular and round shapes of the illustrative stove 10 lend themselves to ease of construction with a minimum of materials.

The presence of the insulative sheet 82 on the surface of the grate 78 serves to increase the lifetime of the grate 78 by further insulating it from the hot coals or the like located in the combustion chamber of the stove 10. Alternately the grate 78 can be formed directly from an insulative material. When so constructed the grate 78 and the insulative sheet 82 are thus combined into a single element serving both as a support surface and insulative layer.

When wood as opposed to charcoal briquettes are used as fuel, little or no ash is formed. Any ash that is formed rest on the surface of the grate 78 and is removed from the stove 10 by simply inverting it. Since the apertures 96 lead off to the side of the grate 78 essentially no ash passes through them. Further since the holes 84, 86, 88 and 90 are relatively small, little or no ash falls through them. Any ash that does fall through the holes 84, 86, 88 or 90 can be easily removed from the stove by opening the damper to it fullest extend and shaking the stove sideways several times.

We claim:

1. A portable stove for burning charcoal and other solid fuels comprising:
    a continuous vertically oriented insulative wall, said insulative wall having a continuous bottom edge, said insulative wall surrounding and defining in part a hollow fuel chamber, said fuel chamber having an open top;
    a grate positioned adjacent said insulative wall proximal to said bottom edge of said insulative wall, said grate forming the bottom of said fuel chamber;
    means for conducting combustion air between said bottom edge of said insulative wall and said grate;
    a reflector plate positioned below said grate;
    an air chamber means for channeling combustion air, said air chamber means surrounding said reflector and the under side of said grate and the bottom most portion of said side wall including said bottom edge and said means for conducting combustion air; and
    air control means for introducing air into said air chamber means in a controlled manner.

2. A portable stove of claim 1 wherein:
    said means for conducting combustion air between said bottom edge of said insulative wall and said grate comprises said insulative wall having a plurality of grooves.

3. A portable stove of claim 2 wherein:
    said grooves are each located in said bottom edge of said insulative wall;
    said grooves are located in said insulative wall in positions immediately adjacent said grate; and
    said grooves are spaced in an array around said insulative wall.

4. A portable stove of claim 1 wherein:
    said grate comprises a solid grate plate having a plurality of grate openings located therein.

5. A portable stove of claim 4 wherein:
    said grate openings are located proximal the center of said grate plate and are spaced inwardly from said grooves in said insulative wall.

6. A portable stove of claim 4 including:
    an insulative layer located on the upper surface of said grate plate.

7. A portable stove of claim 1 including:
    an outside shell, said outside shell having a continuous essentially vertical side wall and a bottom wall; and
    together said bottom wall and a portion of said side wall forming said air chamber means.

8. A portable stove of claim 7 wherein:
    said means for introducing air is located in said bottom wall.

9. A portable stove of claim 8 wherein:
    said means for introducing air includes at least one air inlet orifice in said bottom wall and an adjustable damper positioned on said bottom wall in association with said air inlet orifice, said damper opening and closing said air inlet orifice.

10. A portable stove of claim 7 wherein:
    said reflector plate is positioned between said grate and said bottom wall downwardly from said grate and upwardly from said bottom wall forming a first air space between said grate and said reflector plate and a second air space between said reflector plate and said bottom wall.

11. A portable stove of claim 1 wherein:
    said insulative wall is cylindrical in shape; and
    said grate and said reflector plate are round in shape.

12. A portable stove for burning charcoal and other solid fuels comprising:
    a continuous vertically oriented insulative wall, said insulative wall having a continuous bottom edge, said insulative wall surrounding and defining in part a hollow fuel chamber, said fuel chamber having an open top;
    a grate positioned adjacent said insulative wall proximal to said bottom edge of said insulative wall, said grate forming the bottom of said fuel chamber;
    said insulative wall having a plurality of grooves, said grooves each located in said bottom edge of said insulative wall, said grooves spaced around said insulative wall in an array immediately adjacent said grate;
    a reflector plate positioned below said grate;
    an air chamber means for channeling combustion air, said air chamber means surrounding said reflector and the under side of said grate and the bottom most portion of said side wall having said grooves therein; and air control means for introducing air into said air chamber means in a controlled manner.

13. A portable stove of claim 12 wherein:
said insulative wall is cylindrical in shape; and
said grate and said reflector plate are round in shape.

14. A portable stove of claim 12 including:
an outside shell, said outside shell having a continuous side wall and a bottom wall; and
together said bottom wall and a portion of said side wall forming said air chamber means.

15. A portable stove of claim 14 wherein:
said means for introducing air includes at least one air inlet orifice in said bottom wall and an adjustable damper positioned on said bottom wall in association with said air inlet orifice, said damper opening and closing said air inlet orifice.

16. A portable stove of claim 13 wherein:
said grate comprises a solid grate plate having a plurality of grate openings located therein; and
said grate openings are located in an array proximal to and spaced from the center of said circular grate plate.

17. A portable stove of claim 16 including:
an insulative layer located on the upper surface of said grate plate.

18. A portable stove of claim 13 wherein:
said reflector plate is positioned between said grate and said bottom wall downwardly from said grate and upwardly from said bottom wall forming a first air space between said grate and said reflector plate and a second air space between said reflector plate and said bottom wall.

19. A portable stove for burning charcoal and other solid fuels comprising:
an outside shell, said outside shell having a continuous vertical side wall and a bottom wall;
a continuous vertically oriented insulative wall located in said outside shell adjacent said continuous vertical side wall;
said insulative wall having a continuous bottom edge, said insulative wall surrounding and defining in part a hollow fuel chamber, said fuel chamber having an open top;
a solid grate positioned adjacent said insulative wall proximal to said bottom edge of said insulative wall, said grate forming the bottom of said fuel chamber, said grate having a plurality of grate openings spaced inwardly from said insulative wall;
said insulative wall having a plurality of grooves, said grooves each located in said bottom edge of said insulative wall, said grooves spaced around said insulative wall in an array immediately adjacent said grate;
a reflector plate positioned between said grate and said bottom wall downwardly from said grate and upwardly from said bottom wall forming a first air space between said grate and said reflector plate and a second air space between said reflector plate and said bottom wall;
together said bottom wall and the lower most portion of said side wall forming an air chamber below said grate, said grooves in said insulative wall opening into said air chamber, said first and said second air spaces being located in said air chamber;
least one air inlet orifice in said bottom wall; and
an adjustable damper positioned on said bottom wall in association with said air inlet orifice, said damper opening and closing said air inlet orifice.

20. A portable stove of claim 19 wherein:
said outside shell continuous wall and said insulative wall are cylindrical in shape; and
said grate and said reflector plate are circular in shape.

21. A portable stove of claim 19 further including:
an insulative layer located on the upper surface of said grate; and
said insulative layer including a plurality of insulative layer openings located therein, said insulative layer openings equal in number with and positioned directly over said orifices in said grate.

22. A portable stove of claim 20 further including:
a plurality of air inlet orifices located in said bottom wall in a circular array; and
said damper being circular in shape and including a plurality of damper orifices equal in number to the number of said air inlet orifices, said damper further including a plurality of solid areas interspaced between said damper orifices; and
said damper being rotatively connected to said bottom wall so as to rotate on said bottom wall between a plurality of positions including a first extreme position wherein said solid areas of said damper are positioned directly in line with said air inlet orifices closing said air inlet orifices and a second extreme position wherein said damper orifices are directly in line with said air inlet orifices and a plurality of variable in-between positions, said variable in-between positions being positions in-between the first and second extreme positions and comprising positions wherein said air inlet orifices are partially blocked by varying degrees by said solid areas of said damper.

* * * * *